United States Patent [19]

Reilly

[11] 4,314,262

[45] Feb. 2, 1982

[54] OPTICAL DATA RECORDING MEDIUM
[75] Inventor: Charles M. Reilly, Pasadena, Calif.
[73] Assignee: Xerox Corporation, Stamford, Conn.
[21] Appl. No.: 118,345
[22] Filed: Feb. 4, 1980
[51] Int. Cl.³ .................. G01D 15/34; G01D 15/10
[52] U.S. Cl. .............................. 346/135.1; 346/76 L
[58] Field of Search .................... 346/76 L, 135.1
[56] References Cited
U.S. PATENT DOCUMENTS
4,101,907  7/1978  Bell et al. .................. 346/135.1

OTHER PUBLICATIONS
Bell et al., II, Antireflection Structures For Optical Recording, IEEE Journal of Quantum Electronics, vol. OE-14, No. 7, Jul. 1978, pp. 487–495.

*Primary Examiner*—George H. Miller, Jr.
*Attorney, Agent, or Firm*—Franklyn C. Weiss

[57] ABSTRACT

An optical data recording media which is optimized to yield maximum absorption of the incident recording light and to be responsive to the light incident over a relatively wide range of angles. A transparent dielectric coating is utilized in combination with a metal layer and provides maximum absorption by the metal layer of the recording light incident at various angles for both S and P polarizations. The selected coatings also yield a high contrast ratio for reflectivity at different wavelengths.

7 Claims, 4 Drawing Figures

OPTICAL DATA RECORDING MEDIUM

BACKGROUND OF THE INVENTION

High density serial optical data recording depends on very small marks being made with focused spots of laser light. To permit minimization of the required laser power, it is desirable to couple as much light as possible into the thin layer in which the marks are made and to avoid losses (e.g., due to reflection) from other surfaces or layers. To permit minimization of the mark size, and hence maximization of storage density, it is also desirable to use a high numerical aperture objective lens so as to form a small light spot.

A class of optical recording materials which may be used in optical data recording is thin metal films. These films are generally smooth, grainless and stable, but they reflect most of the light sent onto them, and hence require the use of a powerful laser for rapid marking. However, it is desired to reduce laser power to reduce the cost and complexity of the recording system which has led to the idea of anti-reflection coating of the metal layer.

Conventionally, an anti-reflection effect is achieved by matching the optical impedance of the opaque metal film to that of the incident radiation by forming layers of transparent dielectrics with the proper thicknesses and refractive indices between the metal film and the incident radiation. The anti-reflection layer serves to substantially increase the amount of energy absorbed from the incident radiation. Multiple layers of these dielectrics are needed to effect a significant reduction in reflectivity, but prior art design methods assume single plane wave collimated incident light and are intolerant of non-design incidence angles.

High numerical aperture microscope optics used for recording and readout means that a broad fan of plane waves, over as much as ±72°, is incident upon the anti-reflection layers. Prior art designs pick out a narrow range of these for good coupling into the film and eliminate the rest which can give a performance which is worse than having no coating at all. It is desired, therefore, to provide an anti-reflection coating which is simultaneously effective over a broad angular range of the incident laser light for both S and P polarization while maximizing the amount of incident radiation absorbed by the metal film.

SUMMARY OF THE PRESENT INVENTION

The present invention provides an optical data recording media which is optimized to yield maximum absorption of the incident recording light and to be responsive to the light incident over a relatively wide range of angles. In particular, a transparent dielectric coating is utilized in combination with a metal layer and provides maximum absorption by the metal layer of the recording light incident at various angles for both S and P polarizations. The selected coatings also yield a high contrast ratio for reflectivity.

It is an object of the present invention to provide an improved optical data recording media.

It is a further object of the present invention to provide an improved optical data recording media for laser writing.

It is still a further object of the present invention to provide an optical data recording media which includes an anti-reflection coating which yields maximum absorption of the incident recording light on the metal recording layer thereby reducing the required minimum light energy to record information.

It is an object of the present invention to provide an improved optical data recording media which includes a transparent dielectric coating utilized in combination with a metal layer whereby maximum absorption by the metal layer of the emitting light incident over a wide range of angles for both S and P polarizations and wherein a high contrast ratio for reflectivity at different wavelengths is provided.

BRIEF DESCRIPTION OF THE DRAWINGS

For a better understanding of the invention as well as other objects and further features thereof, reference is made to the following description which is to be read in conjunction with the following figures wherein.

DESCRIPTION OF THE PREFERRED EMBODIMENT

Figure 1:
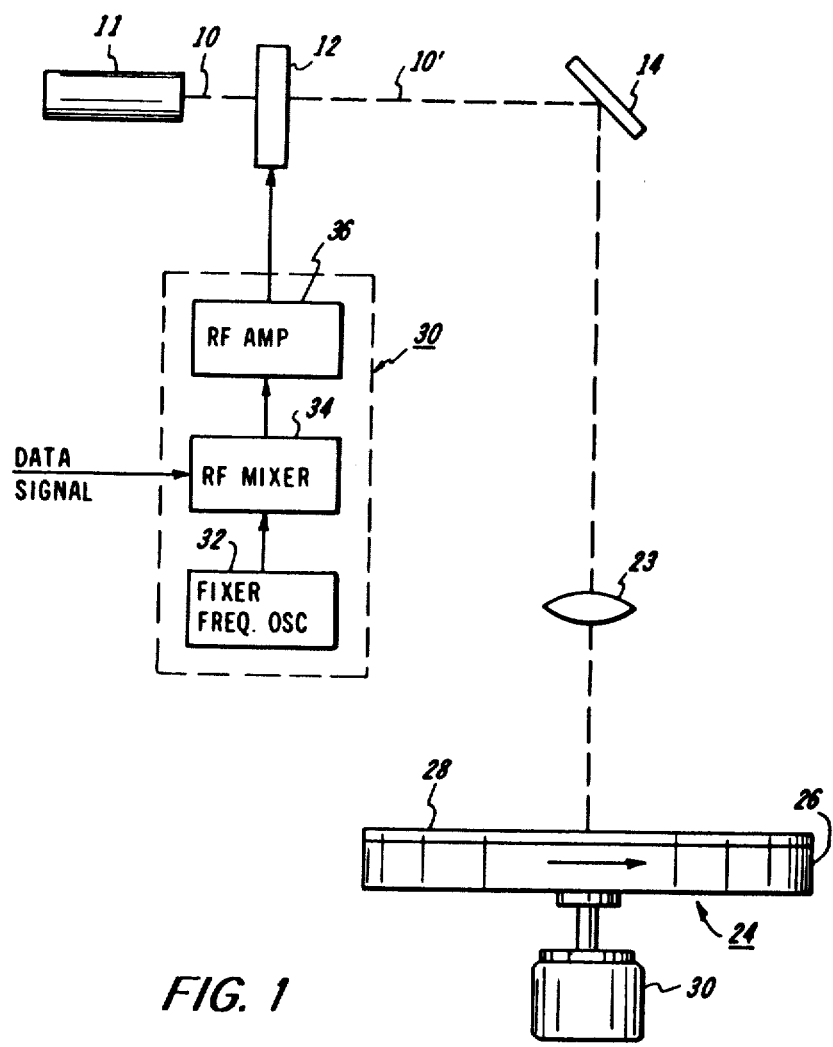
FIG. 1 is a schematic diagram of an optical memory system in which the recording media of the present invention can be utilized.

Referring to FIG. 1, an optical data recording system in which the recording media of the present invention may be utilized is illustrated.

A collimated light beam 10, such as produced, for example, by a helium-neon laser 11, is incident upon a modulator 12 which amplitude modulates light beam 10 in accordance with the data signal supplied thereto. The modulator 12 is a Bragg cell (acousto-optic) type and responds to applied electrical signals to intensity modulate a light beam.

The acousto-optic modulator 12 is used to modulate the light beam 10 in accordance with the information contained in the electrical data signal supplied to the control circuit 30. In the control circuit a fixed frequency oscillator 32 provides an output of constant amplitude and constant frequency which is mixed with the electrical data signal in mixer 34. The output of the mixer 34 is amplified by amplifier 36 and then used as the drive signal to the modulator 12. The output beam 10' of the modulator 12 may be either the zero-order beam or the first-order beam, the intensity of either beam being a function of the amplitude of the driver signal applied to modulator 12.

The details of the acousto-optic modulator 12 and the recording technique utilized to record marks on media 28 with minimal image blur is described in copending application Ser. No. 920,314, filed June 28, 1978 and assigned to the assignee of the instant application, the teachings of which are necessary to the understanding of the present invention being incorporated herein by reference. However, it should be understood that the use of modulator 12 and the image blur minimization techniques described in the referenced patent application are not necessary for operation of the present invention.

A mirror 14 directs the modulated light beam 10' to focusing lens 23, which is preferably a high numerical aperture microscope objective.

After focusing by a lens 23, the amplitude modulated light beam 10' is incident upon a conventional optical memory device 24 comprised of a substrate disk 26 having on one surface thereof a storage or recording medium 28 in the form of a thin film, such as, for example, aluminum. During system operation, the optical memory is rotated at a constant speed by means of a drive motor 30. Light beam 10' produces a change in the optical characteristics of discrete, closely spaced portions of recording medium 28 thereby providing a record of the information conveyed by the data signal supplied to amplitude modulator 12.

Figure 2:
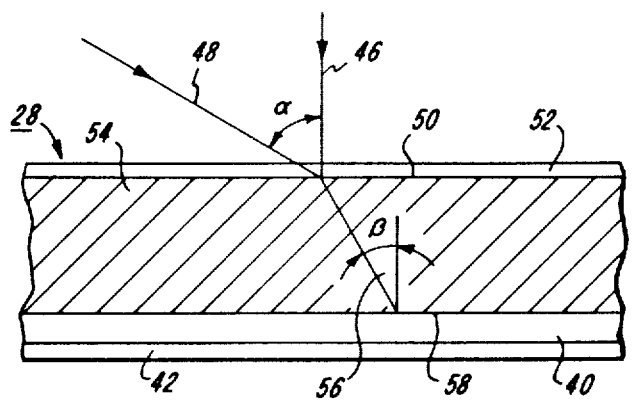
FIG. 2 is a partial cross-sectional view of a metal film supported on a substrate in accordance with the teachings of the present invention.

FIG. 2 describes a generalized model utilized to design recording medium 28 for the optical data recording system set forth in FIG. 1 in accordance with the teachings of the present invention.

The design approach was to provide designs for dielectric coatings, represented by numeral 40, to be used in combination with a metal layer 42 (e.g., aluminum, bismuth, chromium, rhodium, tellerium) to yield maximum absorption by the metal layer 42 of light wavefronts 46 . . . 48 with wavelength $\lambda_o$ (e.g., $\lambda_o = 441.6$ nm which corresponds to the wavelength of blue light emitted by a helium-cadmium laser) incident at various angles (e.g., 0° through 72°) for both S and P polarizations at surface 50 to reduce the required minimum laser power to record information on metal layer 42. As is well known in the field of optics, when optics are used at some angle of incidence other than normal to the surface, the polarization of the incident light is taken into consideration. A polarized coherent beam is characterized by an electric vector in a plane perpendicular to the direction of the beam. When the beam strikes a surface a plane of incidence is formed by the beam and the normal to the plane. For the special case where the vector is perpendicular to this plane the polarization state is called S. If the vector lies in this plane the polarization is called P. The dielectric coating(s) were designed to yield a high contrast ratio for reflectivity with and without the metal layer 42 at some wavelength $\lambda = \lambda_1$ (e.g., $\lambda_1 = 632.8$ nm, the wavelength of light typically provided by a helium-neon laser), as well as at $\lambda = \lambda_o$ and which comprises few layers and non-exotic materials. An antireflection coating 52 may be provided on a substrate 54, the substrate typically made of Crown glass having an index of refraction of 1.52 and approximately one millimeter thick. Materials other than Crown glass may be utilized as substrate 54, such as PMMA plastic, appropriate modifications in coating layer 40 thicknesses being made. The one millimeter thickness of substrate 54 is considered optically "thick" in coating layer design and a change in substrate thickness of an order of magnitude will not affect the coating design.

The angle of incidence $\alpha$ of wavefront 48 to the normal wave 46 is shown to be the limit of 72° mentioned hereinabove. It should be noted that due to the index of refraction of substrate 54, the angle of incidence $\beta$ of refracted wave 56 makes with the normal is less than $\alpha$, typically 39° for an incident angle of 72°. Thus, the substrate 54 allows a high numerical aperture objective lens to be utilized in the optical data system to provide a relatively small writing spot (typically one micron) at the metal layer 42 while reducing the design requirements on the anti-reflection dielectric coating 40. It should be further noted that lens 23 is a high numerical aperture microscope objective (i.e., about 0.95) lens which is used for both writing (as shown) and for readout (not shown).

The resolving power of objective lens 23 depends generally on the design thereof, an objective capable of utilizing a larger angular cone of light coming from an object having a better resolving power than an objective limited to a smaller cone of light (provides more details in the image). However, the image of a point source of flux cannot be reconverged to a point, due to the phenomenon of diffraction. This phenomenon generates a small circular spot light for a lens having a uniformly irradiated pupil. The radius (r) of the first dark ring is a measure of resolvable separation in the image. It can be shown that this separation in the image can be referred back to the object as separation (r) defined by the equation:

$$r = 0.61\lambda/NA$$

where NA is the numerical aperture of the objective. This equation illustrates that the fineness of detail r, which can just be resolved, is inversely proportional to the objective NA. In order words, the greater the NA, the better the resolution.

The structure shown in FIG. 2, as set forth hereinabove, was utilized as a design model to find an optimum recording media configuration.

The thickness of substrate 54 is chosen as a compromise between mechanical strength and optical performance (ease of design) of the objective lens 23 and is not chosen with respect to the anti-reflection layer(s). The first anti-reflection surface coating 52 (FIG. 1) is designed for best performance independent of contrast/ratio considerations. Layers 40 on the second surface are chosen with respect to contrast ratio performance. The first surface anti-reflection coating design and the second surface (metal layer) anti-reflection coating design are generated independently of each other.

The dielectric coating(s) 40 overlying one surface 58 of metal layer 42 (the other surface being uncoated) is designed at metal layer thickness $t_o$ for a reflectivity $\leq 0.01$ at $\lambda_o$ at 0° incidence, the reflectivity then being optimized over a range of incidence angles. The extreme value of the incidence angle $\lambda_{max}$ is defined by the numerical aperture (e.g., NA = 0.95, $\alpha_{max} = 72°$) of the incident beam; here, second surface coatings (second surface being defined as surface 58 of substrate 54, the first surface being illustrated by reference numeral 50), show their advantage strongly since the angle of incidence on the metal coating, $\beta$, is sharply decreased by refraction in the substrate 54 (typically Crown glass, $\eta = 1.52$; $\alpha_{max} = 72°$, $\beta_{max} = 39°$) reflectivity increasing for larger angles of incidence. The variable parameter in the optimization is the thickness of the quarter wave dielectric layers 40; non-quarter wave thickness on all layers was found to increase the performance of the coating. A weighting factor (as a function of angle incidence) was developed for use with a set of thickness variables and a set of reflectivity target values at $\lambda_o$ and $\lambda_1$. The zero degree incidence coatings were then optimized over a range of incidence values for both S and P polarizations. The number of dielectric layers in the coatings was then minimized (e.g., three dielectric layers for aluminum).

Figure 3:
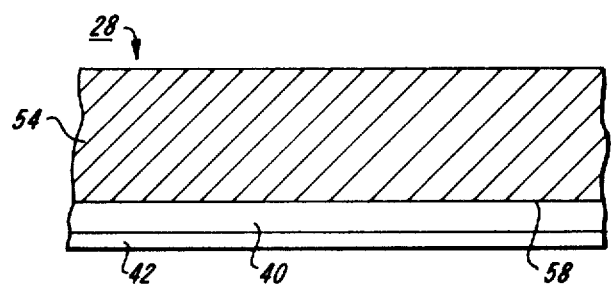
FIG. 3 is a partial cross-sectional view of a chromium film supported on a substrate in accordance with one embodiment of the present invention.

FIG. 3 is the optical recording media 28 using chromium as the metal layer 42 and titanium dioxide ($T_iO_2$)

as the dielectric coating (one layer). The optimized thickness of layer 40 was 0.149 $\lambda_o$ ($\lambda_o$=441.6 nm) and the optimized thickness of layer 42 was 0.040 $\lambda_o$. As set forth hereinabove with reference to FIG. 1, substrate 54 preferably is Crown glass having an index of refraction $\eta$=1.52 and a thickness of 1 millimeter.

Figure 4:
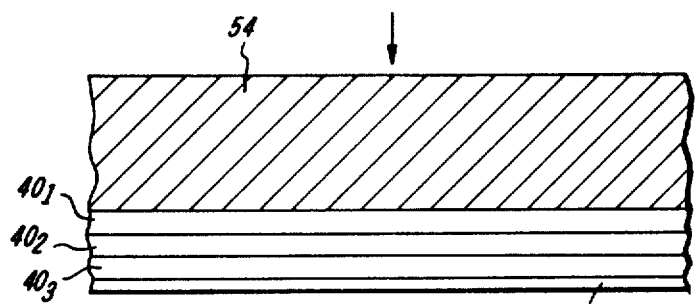
FIG. 4 is a partial cross-sectional view of an aluminum film supported on a substrate in accordance with a second embodiment of the present invention.

FIG. 4 is the optical data recording media 28 using aluminum as the metal layer 42 and a dielectric coating 40 which comprises three layers $40_1$, $40_2$ and $40_3$. Layer $40_1$ comprises titanium dioxide having a thickness 0.325 $\lambda_o$ ($\lambda_o$=441.6 nm), layer $40_2$ is magnesium fluoride (MgF) having a thickness 0.216 $\lambda_o$ and layer $40_3$ is titanium dioxide having a thickness 0.176 $\lambda_o$. The optimized thickness of layer 42 is 0.033 $\lambda_o$. Substrate 54 preferably is Crown glass having an index of refraction $\eta$=1.52 and a thickness 1 millimeter.

It should be noted that the antireflection coating 52 shown in FIG. 2 is designed for a large spread of incidence angles as would be the antireflection dielectric coating(s) 40. Further, coating 52, once designed, could be utilized for any metal layer 42. Coating 52, it should be noted, is not necessary for the operation of the present invention (and is therefore not shown in the FIGS. 3 and 4 embodiments) because only approximately four percent of the incident light power is saved by its utilization.

As noted hereinabove, the amount of laser energy coupled to the metal layer 42 is the primary criteria in the overall design of the optical media 28. Therefore, if the specific metal is selected for use as metal layer 42, dielectric coating(s) 40 are then selected to provide the required incident laser energy.

An important feature of the present invention, as noted hereinabove, was to recognize that separate weighting factors for the energy contained in each of the distributed incident plane waves (weighting factor derived from an analysis of the wavefront characteristics of the incident light beam) was required to provide an optical medium 28 which would provide the required resolution.

While the invention has been described with reference to specific embodiments, it will be understood by those skilled in the art that various changes may be made and equivalents may be substituted for elements thereof without departing from the true spirit and scope of the invention. In addition, many modifications may be made to adapt to a particular situation without departing from the essential teachings of the invention.

What is claimed is:

1. An optical recording medium optimized to yield maximum absorption of recording optical radiation incident on a metal layer portion of said recording medium, the radiation being incident over a relatively wide range of angles comprising:
   a substrate interposed in the path of said incident optical radiation, said substrate being transparent to said incident radiation incident on one surface thereof;
   a dielectric coating overlying the other surface of said substrate, said coating being transparent to said radiation and providing a high contrast ratio for reflectivity, the thickness of said dielectric coating being determined by a weighting factor, said weighting factor being a function of the incident angle of the incident radiation; and
   a metal layer overlying said dielectric coating, said metal layer being responsive to that portion of the radiation incident thereon.

2. The optical recording medium of claim 1 wherein a high numerical aperture optical element is positioned to receive said radiation prior to the radiation being incident on said substrate.

3. The optical recording medium as defined in claim 1 further including an antireflection coating formed on the surface of said substrate receiving said optical radiation.

4. The optical recording medium as defined in claim 1 wherein said incident radiation is produced by a laser means.

5. The optical recording medium as defined in claim 4 wherein said dielectric coating comprises a single layer of titanium dioxide.

6. The optical recording medium as defined in claim 4 wherein said dielectric coating comprises a plurality of layers comprising titanium dioxide, magnesium fluoride, and titanium dioxide.

7. The optical recording medium as defined in claim 4 wherein said substrate comprises glass.

* * * * *